United States Patent [19]

Picinelli

[11] Patent Number: 4,738,706
[45] Date of Patent: Apr. 19, 1988

[54] METHOD AND DEVICE FOR THE THERMAL REGULATION OF A MOVING FLUID MASS

[75] Inventor: Vittorio Picinelli, Mantova, Italy

[73] Assignee: Glass Advanced Technology Corporation, Panama City, Panama

[21] Appl. No.: 896,180

[22] Filed: Aug. 13, 1986

[30] Foreign Application Priority Data

Aug. 14, 1985 [CH] Switzerland .......................... 3485/85

[51] Int. Cl.⁴ .............................................. C03B 5/23
[52] U.S. Cl. ......................................... 65/136; 65/137; 65/158; 65/162; 65/337; 374/204; 374/208
[58] Field of Search ................. 65/136, 137, 162, 158, 65/337; 374/204, 208, 179

[56] References Cited

U.S. PATENT DOCUMENTS

| | | |
|---|---|---|
| 1,900,261 | 3/1933 | Mulholland et al. |
| 3,010,657 | 11/1961 | Post ........................................ 65/162 |
| 3,232,794 | 2/1966 | Korton ............................. 374/208 X |
| 3,915,682 | 10/1975 | Chotin et al. ...................... 65/162 X |
| 3,923,552 | 12/1975 | Parris ................................ 374/208 X |
| 4,375,368 | 3/1983 | Stevenson ......................... 65/137 X |
| 4,389,725 | 6/1983 | Barkhau et al. ....................... 373/40 |
| 4,515,614 | 5/1985 | Barkhau et al. ......................... 65/29 |
| 4,552,579 | 11/1985 | Blumenfeld et al. ............. 65/337 X |
| 4,622,059 | 11/1986 | Brown ............................... 65/136 X |

Primary Examiner—Arthur Kellogg
Attorney, Agent, or Firm—Felfe & Lynch

[57] ABSTRACT

The device comprises a three-dimensional grid of thermocouples which are immersed in a fluid, which is moving in a covered channel and has a temperature above that of its environment. Apertures in the sheathing of the channel can be progressively closed by shutters so as to control the cooling of the fluid through an outgoing radiation through the apertures. Burners with a variable intensity are placed within the channel and allow to heat up the fluid in the vicinity of each burner. The position of each shutter and the fuel flow to each burner are commanded severally, based on the values emitted by the ensemable of the thermocouples in order to obtain a homogeneous repartition of the temperature of the fluid, transversally with respect to the channel.

21 Claims, 5 Drawing Sheets

METHOD AND DEVICE FOR THE THERMAL REGULATION OF A MOVING FLUID MASS

BACKGROUND OF THE INVENTION

This invention relates to a device for regulating the temperature of a fluid mass which flows through an enclosure. This invention can in particular be used to improved the thermal homogeneity of molten glass before it is fed into machines for forming it into manufactured products such as glass sheets, glass fibers for insulation or for the reinforcement of plastic material, containers such as bottles, pots, flasks etc.

Indeed, it is important that the mass of molten glass has an essentially homogeneous temperature when it reaches the machine which forms it into a manufactured product. But between the oven and said machine, the molten glass must pass through an enclosure which generally is in the shape of a covered tunnel, the walls of which are covered with a refractory material.

Due to thermal exchanges between the molten glass and the refractory material which cover the lateral walls of the enclosure, the banks of the current of molten glass cool down faster than the central path of the current. This effect is reinforced because the flow of molten glass is slowed down along the banks through the friction of the glass on the refractory material of the lateral walls of the enclosure. This leads to noticeable differences of temperature within one and the same transversal cross section of the glass flow. The present invention aims at reducing the thermal fluctuation in a fluid moving mass, and in particular within flow of molten glass which covers an enclosure. In this particular case the shape of the enclosure can vary, depending on the rate of flow of the molten glass, and also on the type of glass shaping machines which are placed downstream of the enclosure.

When manufacturing sheet glass, the enclosure generally has the shape of a covered tunnel which can be 10 meters wide, 20 meters long and 1 meter deep and have daily transfer of several hundred tons of glass.

When manufacturing hollow containers (bottles, flasks, pots, drinking glasses, etc.) and glass fiber, the main channel is generally less than 2 meters wide and flows into secondary channels called feeders, the width of which generally is less than 1.5 meters. These secondary channels feed different glass manufacturing machines. The main channel can in particular have the shape of a semi-cylindrical enclosure which feeds radially arranged secondary channels. In this case the enclosure generally is called the forehearth. In other cases the main channel can also be rectangular.

DESCRIPTION OF THE PRIOR ART

Whatever the geometry of said enclosure, it is known to provide its ceiling with apertures, a section of which can be regulated in order to obtain the desired cooling (British Pat. No. 355,555; U.S. Pat. No. 1,900,361). Because the current of molten glass which flows through the channel cools down along its banks rather than in the center, it is also known and described in said patents to provide above the surface of the glass heating means which can be burners fed by gaseous or liquid fuel. The regulation of the cooling means provided by the apertures and of the heating means provided by the burners is done empirically, based on observations or measures performed at the surface of the current, generally along the axis of said current. However, it turns out that although the information obtained by such a one-dimensional, or at best two-dimensional, grid of measuring points allows to perform a global regulation of the average temperature of the fluid, this information is insufficient for obtaining and maintaining a homogeneous temperature transversely to the flow, by means of local actions, i.e. by varying the section of various apertures and also the thermal energy delivered by different burners. Moreover, the thermal conductivity of molten glass depends on its temperature, and thus any temperature gradient within the glass can, under certain conditions, contribute to a further increase of the already existing nonhomogeneity, which makes it particularly desirable to act locally on the temperature, where this action is based on the most extensive information possible.

SUMMARY OF THE INVENTION

The desired aim is realized through the invention, such as described in the claims.

When manufacturing flat glass sheets, in which application the width of the channel may exceed 10 meters, it is possible to provide several rows of apertures, where each row is aligned parallel to the flow of the glass. The same can be done for the main channels used when manufacturing hollow containers or glass fiber. In the case of a semicircular enclosure, it will be preferable to arrange the apertures in a fanlike pattern, and to align them with certain secondary channels. The secondary channels themselves may exhibit a single row of apertures along their axes. If the covered channel comprises burners, it is advantageous to provide elements, which preferentially reflect onto the glass the heat emitted by burners which are situated near the lateral walls of the enclosure.

The various features of novelty which characterize the invention are pointed out with particularity in the claims annexed to and forming a part of the specification. For a better understanding of the invention, its operating advantages and specific objects obtained by its use, reference should be had to the accompanying drawings and descriptive matter in which there is illustrated and described a preferred embodiment of the invention.

DESCRIPTION OF THE PREFERRED EMBODIMENTS

Figure 1:
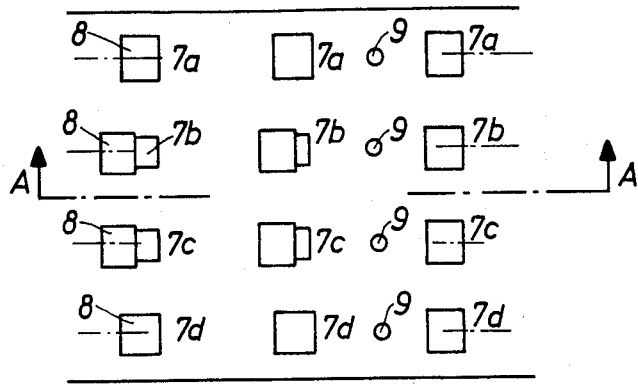
FIG. 1 is a partial and schematical plan view of a device according to the present invention.
Figure 2:
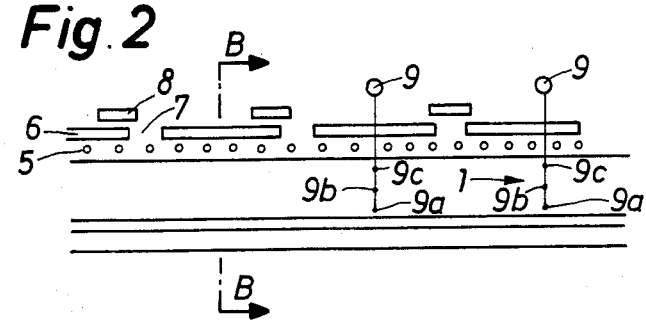
FIG. 2 is a view along the longitudinal section A—A of FIG. 1.
Figure 3:
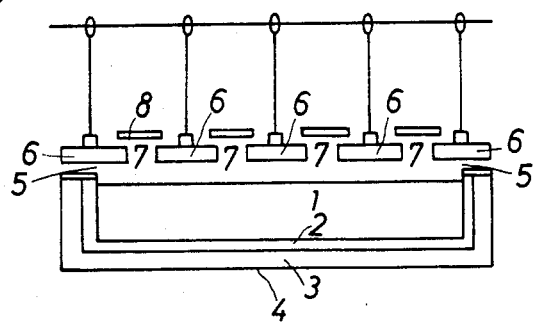
FIG. 3 is a view along the transversal section B—B of FIG. 2.
Figure 4:
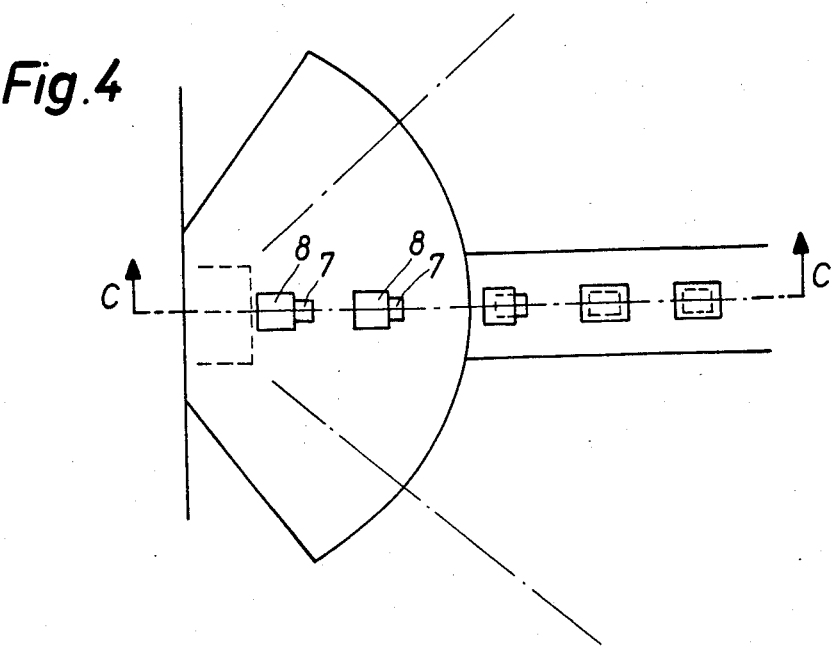
FIG. 4 is a schematical and partial plan view of a second embodiment.
Figure 5:
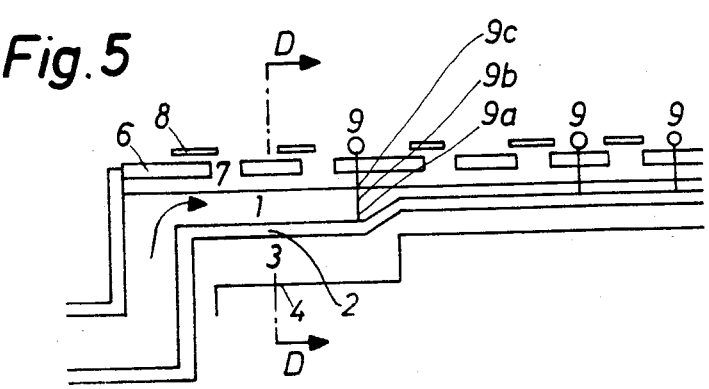
FIG. 5 is a view along the transversal section C—C of FIG. 4.
Figure 6:
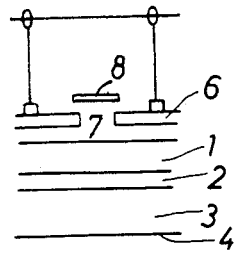
FIG. 6 is a view along the transversal section D—D of FIG. 5.
Figure 8:
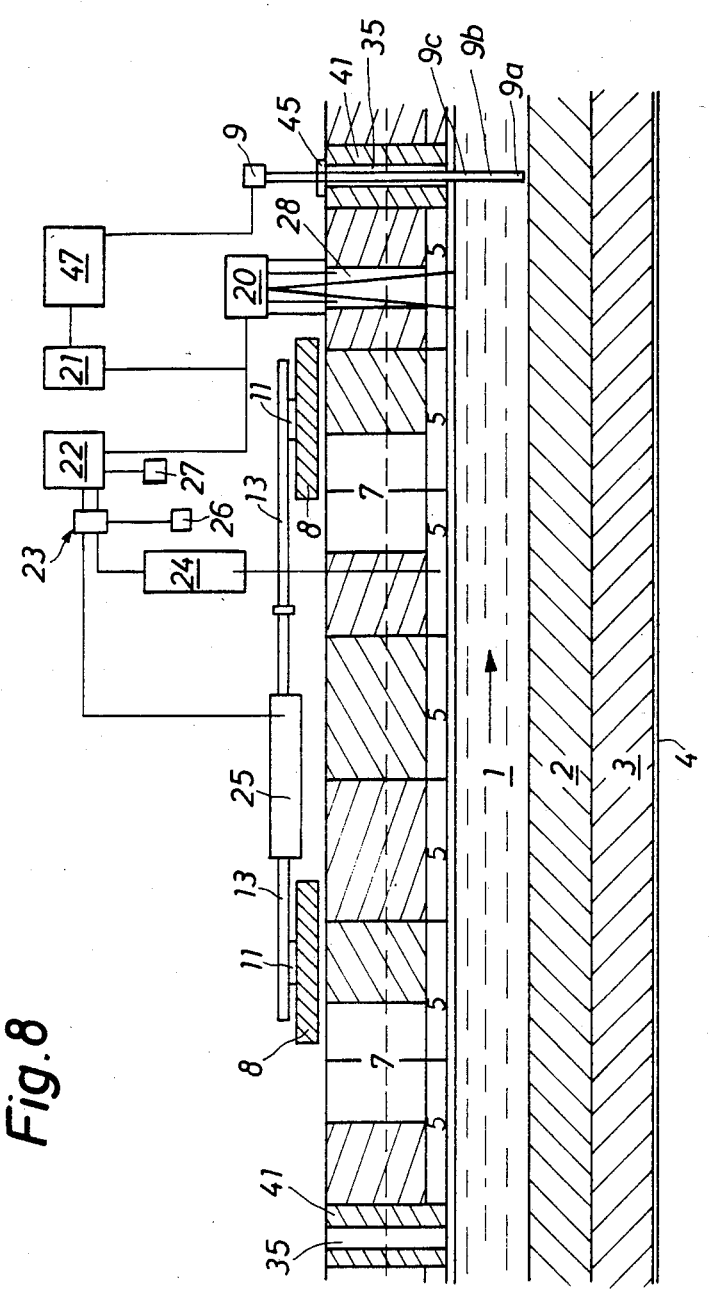
FIG. 8 represents a partial longitudinal section of the selfsame channel.

Referring in particular to FIGS. 2, 3 and 8, the molten glass, designated by the reference number 1, flows through a channel 2 made of refractory material. Insulating material 3 is inserted between this channel 2 and a metallic frame 4. The channel 2 is covered along its whole length by covering slabs 6 which are also made of refractory material and supported in a way well-known in the art.

At regular intervals the covering slabs 6 exhibit apertures 7 which are aligned in rows parallel to the axial plane of the channel. Above each of these apertures 7 is placed a shutter 8 which can be moved horizontally parallel to the axial plane of the channel, and which allows to increase or to reduce this open section of the aperture 7, through which escapes thermal energy emitted by the surface of the molten glass. This thermal flow induces a cooling of the glass, which cooling progresses from the surface of the glass towards the ground of the channel, in a way which depends on the chemical composition of the glass, on its temperature, on its rate of flow, on the depth of the flow of molten glass and on the relative opening of the shutters 8.

The temperature of the glass at different depths is measured by way of pyrometric rods 9, each of which contains several thermocouples $9a$, $9b$, $9c$. Based on the ensemable of all these measures one determines severally for each of the apertures $7a$–$7d$ the relative aperture which will lead to an optimal repartition of the temperature. This determination can be done by hand, but preferably the shutters will be commanded by digital circuits which will receive the signals emitted by the thermocouples. Because each aperture is commanded both in function of its lateral and longitudinal position above the channel and also in function of a set of temperatures measured at the surface of the molten glass and also at different depths within the same, it is possible to regulate the degree of relative opening of the apertures in a way which leads to an improved homogenization of the temperature of the glass in the planes transversal to its flow. Given that the apertures $7a$ and $7d$ are nearer the lateral walls, these apertures will be maintained more closed than the apertures $7b$ and $7c$. Thus the glass will be less cooled along the side walls than near the axial plane of the channel.

Reference will now be more particularly made to FIGS. 4 through 9 which illustrate an embodiment particularly adapted to an enclosure which is composed of an essentially semicircular forehearth, from which several secondary channels radiate in a fanlike pattern. The embodiment of FIG. 4 comprises three secondary channels, of which only one is shown in the drawing and described in more detail with the help of FIGS. 7 through 9, which figures could also be used to represent the other secondary channels. When the molten glass 1 has risen again from the outlet of the oven (not represented in the drawing), it divides into as many veins as there are secondary channels connected to the forehearth. In the forehearth the glass is in contact with refractory material 2 which is thermally insulated through an insulating material 3, which itself is supported by a metallic structure 4. The enclosure is entirely covered by covering slabs 6 which exhibit at regular intervals apertures 7 which are aligned along the radial axis of the glass current. Above each aperture 7 is placed a shutter 8 which can be moved horizontally, and parallel to said axis. A manual or an automatic regulation of the shutters 8 allows to increase or to reduce the sections of the opening 7, through which the thermal flow emitted by the surface of the molten glass can escape. Further, pyrometric rods (each of which comprises several thermocouples $9a$, $9b$, $9c$ placed at different depths) are provided on each vein of molten glass in order to measure the temperatures, from which one then deduces the optimal relative opening of each shutter 8.

Figure 7:
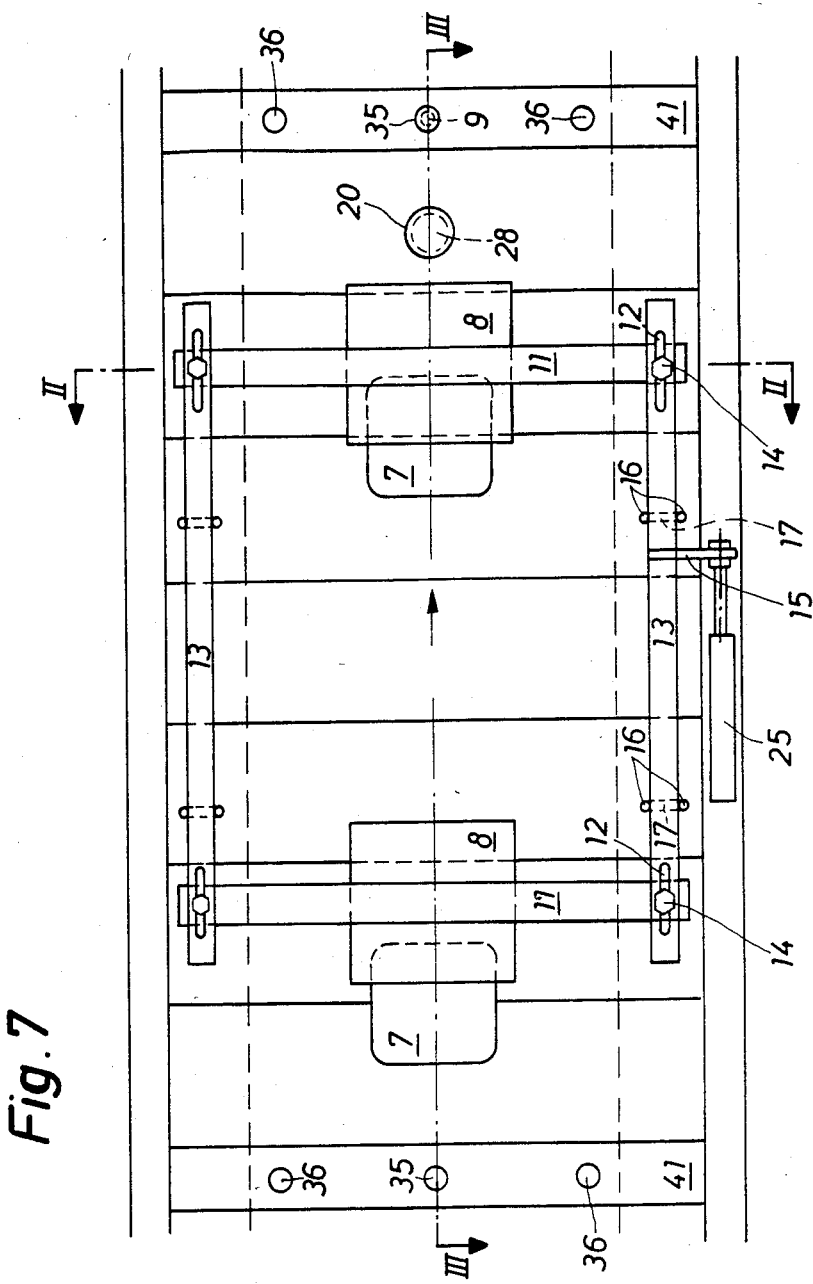
FIG. 7 represents a partial plan view of one of the secondary channels of FIG. 6.
Figure 9:
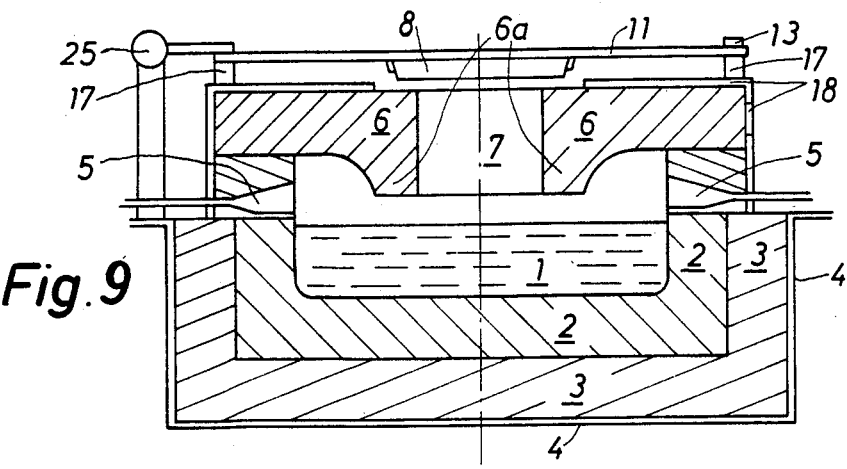
FIG. 9 represents a transversal section of the same channel.

It will now be referred more particularly to FIGS. 7 through 9, where the reference numbers remain the same as before for all elements which have essentially the same function. FIGS. 8 and 9 show burners 5 which use a liquid or gaseous fuel and are integrated into the lateral walls of the channel 2, above the level of the molten glass. Each of these burners 5 has a reflector in which burns the flame produced by burning a mixture of air and fuel. The radiation heat produced by the flames is transmitted from the burners 5 on the bank of the channel 2 to the flow of molten glass 1, and also to the covering slab 6, the lower surface of which preferentially comprises a longitudinal rim $6a$ opposite to each row of burners 5, in order to reflect the radiation of the flames onto the banks of the current of molten glass. Apart from this heat distribution through radiation, convection currents of hot gases are formed in two lateral passages limited by the rims $6a$, the burners 5, the banks of the channel 2 and the glass 1. These convection currents contribute to heat up the sides of the molten glass current. This heating up is further increased by a thermal insulation of the sides of the covering slab 6 by means of refractory material 18. As before, the slab 6 comprises apertures 7 along its axis. A sliding shutter 8 is placed above each of these apertures 7 and allows to increase or to reduce the section of the thermal flow which escapes from the glass.

The installation is divided in the longitudinal direction into sections which are separated by panels 41. The shutters 8 of a single section are fixed to a metallic frame which comprises transveral bars 11 that are adjustably fixed to two longitudinal bars 13. The mutual adjustment of bars 11 and 13 is performed by means of elongated rows 12 provided in the bars 11, and through bolts 14 which are engaged in these holes in order to connect the bars 11 and 13. This adjustable connection between the bars 11 and 13 allows to modify the relative positions of the shutters 8 which belong to the same metallic frame. It is thus possible to scale the amplitude of the closing or of the opening of the apertures 7 through the shutters 8 according to the direction of flow of the molten glass. In fact, the thermal conductivity of the glass decreases when its temperature sinks. Thus, the hotter the glass is, the easier it is to cool it without increasing the thermal nonhomogeneity within its bulk. On the other hand, the colder the glass is, the more it is necessary to restrict its cooling if one wants to avoid an increase of the thermal gradient between the glass at the surface and the glass lower down in the channel.

The longitudinal bars 13 are mounted on rollers 17 (FIG. 9) in order to allow a longitudinal movement of the frame formed by the rods 11 and 13. A pneumatic or electric jack 25 urges a bar 15 which is fixed to one of the bars 13 in order to move the shutter 8 in one or the other direction, and thus to increase or to decrease the sections of the apertures 7.

The movements of the shutters 8 and the output of the burners 5 are commanded by a regulation circuit which will be described in more detail with reference to FIG. 8. An essential part of the circuit is a series of radiation pyrometers 20 which measure the temperature at the surface of the molten glass along the central axis of the glass flow. These pyrometers 20 are mounted on a slab 6, preferably one pyrometer for each section, and above a cylindrical observation hole 28 which is provided in the slab 6. The surface temperature measured by each pyrometer 20 is transformed into a measuring signal which is registered in a memory 21 and processed in a comparator 22 which compares the measured signals with desired signal values stored in a memory 27. The desired values are programmed either by hand or by a computer and correspond to an optimal temperature of the glass. Based on the result of the comparison between the desired value and the measured signals, the comparator 22 can trigger either command signals for circuit 23 which commands the jack 25 in order to increase or reduce the relative opening of the apertures 7, or command signals which act on a valve 24 which raises or lowers the intensity of the burners 5. This automatic regulation works until the temperature observed by the radiation pyrometer 20 equals the desired temperature stored in the memory 27. Preferably these values will be simultaneously displayed on a display device (not shown in the drawing).

When it is not needed to cool the axial region of the molten glass current 1, the shutters 8 can close the apertures 7, leaving only a slit open for the escape of the combustion gases. It will be noted that the width of the apertures 7 is about one-third of the full width of the channel.

When the shutters 8 cover the apertures 7, then the shutters will reflect the radiations emitted by the glass. On the other hand, when the apertures 7 are open, then the thermal radiation emitted by the glass is not reflected, and hence the glass is cooled along an axial band, the width of which is approximately one-third of the total surface of the molten glass.

The rate of cooling naturally depends on the relative opening of the shutters 8. This cooling of the glass in the axial region increases its viscosity and hence reduces the speed of its flow, which induces a relative acceleration of the glass flow along the banks and diminishes its cooling in the lateral regions. Under these conditions one has even recorded in the central region temperatures which were below those measured in the lateral regions.

There exists a relation between the heating or the cooling of the glass at the surface and the heat transmission within the mass of the glass. This transmission depends on the chemical composition of the glass, and its temperature, on the depth at which the observation is made, on the rate of flow etc. In order to automatically take into account the different factors, it is advantageous to provide means which automatically modify the desired temperature as a function of the temperature distribution inside the mass of molten glass. To this end several measuring points have been provided in line with each of the panels 41 which delimit the longitudinal sections of the channel. In the example shown, these panels comprise two lateral holes 36 and a central hole 35 in which are mounted pyrometric rods 9 which allow to measure the temperature at different levels within the mass of molten glass. In the example shown the three levels are 9a, 9b, 9c. The values measured by each pyrometric rod 9 are processed in a computer 47 and the values thus obtained are used for automatically adjusting the rated temperature values recorded in the memory 27 as a function of the temperatures measured within the mass of molten glass. This adjustment of the rated temperature values allows to improved the vertical thermal homogeneity within the molten glass.

Considering that the lifetime of measuring instruments which work in a hostile environment, like a flow of molten glass, is often uncertain, it is sometimes useful, or even vital, to provide alarm means which give a warning when a measuring circuit does not function properly. In order to avoid that the erroneous values delivered by such a circuit disrupt the entire temperature regulation, which can have dire consequences, it is desirable that the regulating circuits disregard the erroneous values as soon as possible. Now these operations (the triggering of an attention signal and the disconnecting of a measuring unit which emits doubtful values) can be easily performed with a device according to the invention. Indeed, due to purely thermodynamical reasons, the ensemble of temperatures measured in numerous measuring points but whilst disregarding one particular measuring point, determines an interval of values within which the temperature of the disregarded measuring point must necessarily lie. It is therefore possible to provide a circuit which calculates for each measuring point the largest interval within which the temperature of this point must lie—even under the most extreme conditions—when one takes into account a set of temperatures measured at other points, either in all available measuring points or solely in a subset of the same. Such a subset will generally consist of points which are in the neighborhood of the point which is to be checked. A supervising circuit is designed so that it emits a warning signal when a measuring unit pertaining to a point which is to be checked emits a signal which corresponds to a temperature outside the interval of temperatures which are possible in this point, given the constraints due to measures made in other points. In this case the supervising circuit can further disconnect said measuring units so that it does not influence the regulation anymore, or else it can also multiply the signal emitted in said point with a weight coefficient which reduces in a predetermined way its influence on the regulation, and where this coefficient can become zero in the limit. Disconnecting the doubtful unit will be the preferred choice where one expects a sudden breakdown of the measuring units, whilst the introduction of a weight coefficient which reduces the influence of the doubtful measure will be preferred if one expects a progressive deterioration of the measuring unit.

Figure 10:
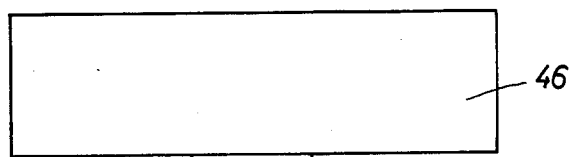
FIG. 10 is a view of a pyrometric rod, with parts left away.
Figure 11:
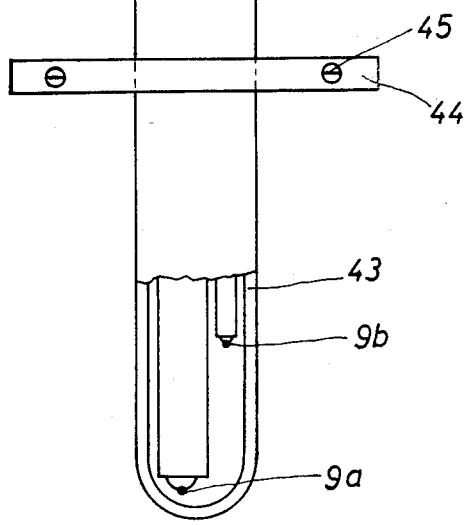
FIG. 11 is a cross section of this same rod.
Figure 11:
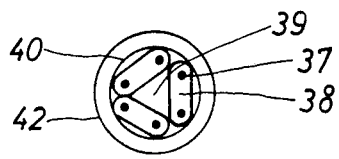

FIGS. 10 and 11 illustrate a preferred embodiment of a pyrometric rod 9 intended for the device of FIGS. 1 through 9. This pyrometric rod 9 comprises three thermocouples 9a, 9b and 9c (the last of which is not represented in FIG. 10) which are situated at different levels. Each thermocouple comprises a 6% platinum rhodium wire and a 30% platinum rhodium wire. The solder which unites these two wires represents the thermocouple which produces an electromative force corresponding to the temperature to which the thermocouple is submitted. Each platinum rhodium wire 37 is insulated from the neighboring one by a capillary tube 38 made of alumina. The entire set of six capillary tubes is cemented with an aluminous cement 39 and placed within a one-ended tube 40 made of alumina. This tube 40 is protected against erosion due to the action of the molten glass into which it is plunged by a second one-ended tube 42, made of platinum rhodium. Preferably the tube 42 is as short as possible, which can be done by crimping it into grooves 43 which are provided on the alumina tube 40, above the surface of the molten glass.

The tube 40 is maintained in a collar 44 which rests on the upper surface of a panel 41 and which dictates how far the rod is immersed. Two screws 45 allow to modify the depth at which the rod 9 is immersed.

At its upper part, the rod 9 comprises a measuring head 46 which is sealed onto the tube 40. The outlet connections of the three thermocouples are placed in this measuring head 46.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A method for regulating the temperature distribution in a fluid medium which flows in an enclosure with a ceiling and has a temperature higher than that outside the enclosure, comprising: measuring local temperatures of the fluid at nodes of a three-dimensional grid of measuring points; and adjusting a dimension of one or more open cross sections of one or more apertures with variable cross sections provided in the ceiling of the enclosure based on an ensemble of said measurements.

2. The method of claim 1 wherein the grid has meshes parallelepipedic, with one axis oriented in the direction of the flow of the fluid.

3. The method of claim 2, wherein a number of nodes of the grid lie at the surface of the fluid medium, and that the temperature at these nodes is determined by means of radiation pyrometers.

4. The method of claim 1, wherein said one or more open cross sections are regulated as a function of temperature differences observed between given measuring points and points situated essentially on the same flow line of the fluid as the corresponding measuring point, either upstream or downstream of the latter.

5. The method of claim 1, wherein said one or more open cross-sections are regulated as a function of temperature differences observed between given measuring points and points situated essentially on the same surface orthogonal to the flow line of the fluid as the corresponding measuring point.

6. The method of claim 1, wherein the open cross sections of the apertures are adjusted in such a way that the temperature differences in the direction of the flow lines and transversally to the same are maintained equal or inferior to certain threshold values.

7. The method for regulating the temperature distribution in a fluid medium of claim 1 wherein there is at least one heat source in the enclosure and/or recessed in its walls and the thermal output of said least one heat source is regulated.

8. A device for performing the method of claim 1 to achieve a thermal homogenization of a molten mass which flows through an enclosure covered by slabs, comprising a plurality of apertures situated in the covering and provided with mobile shutters; means for measuring the temperature of said mass at nodes of a three-dimensional grid of measuring points; and means for adjusting the positions of the shutters as a function of the measurements at said nodes.

9. The device of claim 8, further comprising heating means placed within the molten mass and/or within the walls of the enclosure.

10. The device of claim 8, wherein the shutters are mounted, either individually or as groups, in mobile frames placed above the slabs, and said frames are supported by rollers and movable through the action of at least one moving means.

11. The device of claim 8 further comprising pyrometric measuring rods which are mounted on the slabs and which extend into the molten mass.

12. The device of claim 11, wherein at least some of the rods comprise several thermocouples placed at different heights.

13. The device of claim 11, wherein several rods are mounted on a single panel transverse to the slabs, and which carries one central rod and two lateral rods.

14. The device of claim 11, wherein at least one rod comprises a tube which is closed at one end and made of platinum rhodium crimped into a groove provided in a coaxial inner tube made of aluminum oxide.

15. The device of claim 14, wherein the inner tube contains at least one thermocouple and which is protected against erosion by the inner tube.

16. The device of claim 8 further comprising radiation pyrometers which are mounted on the slabs, so as to measure the surface temperature of the molten mass.

17. The device of claim 8, wherein the adjustment means is an electrical regulating circuit designed so as to multiply with a factor smaller than one, and which may become zero, the signals emitted by any one of the measuring means whenever the values of these signals are outside a first interval determined by all other measured values, and in that it is designed so as to trigger an attention signal when said values are outside a second interval which contains the first.

18. The device of claim 8 further comprising burners placed in the lateral parts of the enclosure and above the level of the molten mass.

19. The device of claim 18 further comprising means for adjusting the thermal output of the burners as a function of the measurements at said modes.

20. A method of homogenizing the temperature of molten glass which flows along a channel made of refractory material and having a ceiling comprising: measuring local temperatures of the fluid at nodes of a three-dimensional grid of measuring points; and adjusting a dimension of one or more open cross sections of one or more apertures with variable cross sections provided in the ceiling of the enclosure based on an ensemble of said measurements.

21. The method of homogenizing the temperature of molten glass of claim 20 further comprising adjusting the thermal output of at least one heat source provided in the enclosure and/or recessed in the wall of said enclosure based on the ensemble of measurements.

* * * * *